Patented Nov. 17, 1925.

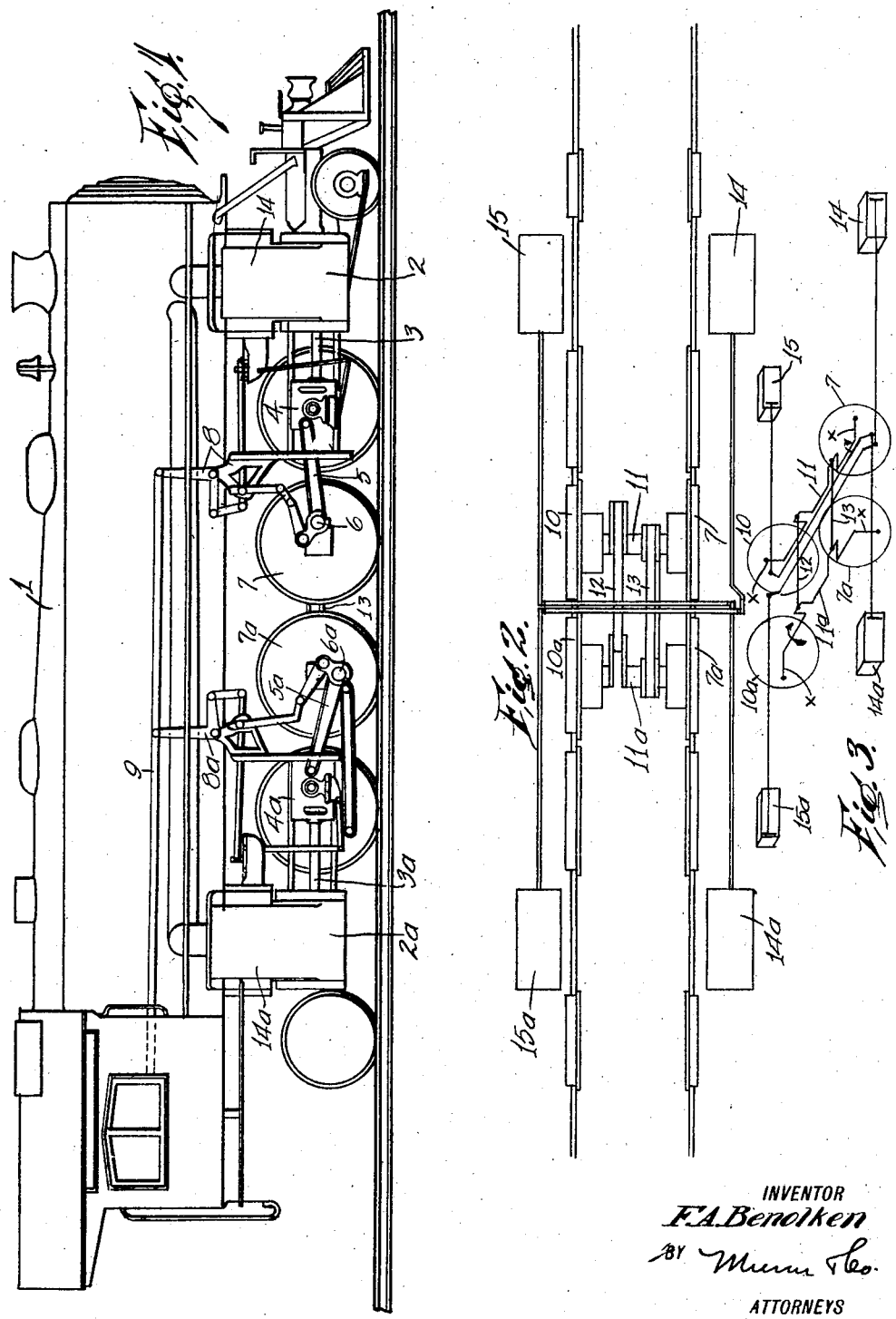

1,562,284

UNITED STATES PATENT OFFICE.

FRANK ARNOLD BENOLKEN, OF HELENA, MONTANA.

LOCOMOTIVE CONSTRUCTION.

Application filed September 12, 1924. Serial No. 737,332.

*To all whom it may concern:*

Be it known that I, FRANK A. BENOLKEN, a citizen of the United States, and a resident of Helena, in the county of Lewis and Clark and State of Montana, have invented a new and useful Improvement in Locomotive Constructions, of which the following is a full, clear, and exact description.

My invention relates to improvements in locomotives of the high pressure type, and it consists in the combinations, constructions and arrangements herein described and claimed.

In the ordinary high pressure locomotive construction, in which superheaters are used, the pistons in the cylinders on each side of the engine operate at substantially 180° apart, so that when the piston on one side is traveling rearwardly, the piston on the opposite side is traveling forwardly, and vice versa. In climbing grades or in hauling heavy trains, it is sometimes very difficult to operate, due to the fact that the power strokes come so infrequently, especially when the train is proceeding very slowly.

An object of my invention is to provide a device of the type described, in which power strokes are doubled, so that an engine, instead of laboring as the ordinary engine labors in hauling a heavy train up a grade, will ascend the grade at a greater speed.

A further object of my invention is to provide a device having four cylinders and four drivers, these four drivers being coupled together, so that they operate as one.

A further object of my invention is to provide a device of the type described, in which a gain in power and speed is accomplished, without a proportional increase in cost.

Other objects and advantages will appear in the following specification, and the novel features of the invention will be particularly pointed out in the appended claim.

My invention is illustrated in the accompanying drawings, forming part of this application, in which—

Figure 1 is a side view of a locomotive constructed in accordance with my invention, Figure 2 is a diagrammatic plan view, showing the manner in which the drive wheels are coupled together, and Figure 3 is a schematic view showing the relative positions of the drive wheels.

In the drawing, 1 indicates, in general, a locomotive having a front cylinder 2, with a piston (not shown), a piston rod 3, a cross head 4, and a connecting rod 5. The latter is connected at 6 with the crank pin of the driver 7. The valve motion 8 is of the usual construction, and all the parts thus far described are found in the ordinary engine.

To the rear of the driver 7 is a second cylinder 2ª, having a piston rod 3ª, cross head 4ª, pitman or connecting rod 5ª, which is connected to a crank pin 6ª on a driver 7ª. A valve motion 8ª is provided, which is similar to the valve motion 8. These valve motions are both connected by a common operating rod 9, which extends to the cab and which may be used to reverse the direction of motion, as desired. On the opposite side of the engine are two cylinders (not shown), corresponding to the cylinders 2 and 2ª respectively, and which are connected to two drivers 10 and 10ª (see Figure 2). The cylinders and their connections are precisely the same as those already described. The drivers 7 and 10 are connected by a crank shaft 11, while the drivers 7ª and 10ª are connected by a crank shaft 11ª. It will be observed from Figure 2, that the crank shafts 11 and 11ª are connected by means of links 12 and 13, so that the drivers work in unison, one driver being at 90° from the next.

In order to show the relationship of the valves and the drivers, I have indicated schematically these parts in Figure 3. In both Figures 2 and 3, the valves are indicated at 14, 14ª, 15 and 15ª respectively. The valves 14 at the front and 15ª in the rear are connected together, so as to operate the same way, that is to say, the valves 14 and 15ª are 180° apart, and are 90° from the valves 15 and 14ª. The drive wheels bear this same relation. In Figure 3, it will be observed that there is a line extending at right angles to the line indicating the crank shafts 11 and 11ª at the ends thereof. These lines I have designated X. They represent the distance between the center of the wheel, i. e., the axis of the crank shaft, and the crank pin connection to the pitman or connecting rod. It will be observed that all of these lines X are 90° apart, that is to say, the crank pin of the wheel 7 is at 90° from the crank pin of the wheel 10, while the crank pins of the wheels 7ª and 10ª are 90° apart. The crank pins of the wheels on the same side, as for instance, of the wheels 7 and 7ª, are also 90° apart. This arrangement provides for four impulses or power strokes, where the ordinary engine would have two. These strokes come in regular succession, so that where the drive wheels are connected up together so as to work in unison, there is a gain in power which is greater than the proportional extra amount of steam necessary to operate the device.

The device herein shown in designed to operate with two superheaters (not shown), which arrangement forms the subject of a separate application. The invention in the present instance, however, is primarily directed to the use of rear cylinders and drivers on each side, and in which the rear drivers are connected with the drivers operated by the front cylinders, so as to work in unison, as stated.

The arrangement described would obviate the necessity of using an additional engine for heavy trains, as where the latter are drawn up heavy grades. Obviously, with two separate locomotives, it is necessary to have two complete equipments, including the crew which operates the engine, in order to attain twice the power of one engine or locomotive. In the present instance, while more steam is used, of course, in operating the two sets of cylinders, on either side, there is not twice as much steam, nor is it necessary to employ an extra crew, so that there is a material saving not only in power, but in the cost of operation.

I claim:

In a locomotive construction, front and rear cylinders on each side, a drive wheel corresponding to each cylinder, a crank shaft connecting the front drive wheels, a crank shaft connecting the rear drive wheels, links for connecting the crank shafts together, and connections from said cylinders to said drive wheels, said connections including crank pins and connecting rods, the crank pins of the front drive wheels being disposed at 90° from each other, and the crank pins of the front and rear drive wheels on either side being also disposed at 90° from each other.

FRANK ARNOLD BENOLKEN.